US009176012B2

(12) United States Patent
Lieberman

(10) Patent No.: US 9,176,012 B2
(45) Date of Patent: Nov. 3, 2015

(54) METHODS AND SYSTEMS FOR IMPROVED MEMBRANE BASED CALORIMETERS

(76) Inventor: David Samuel Lieberman, San Francisco, CA (US)

( * ) Notice: Subject to any disclaimer, the term of this patent is extended or adjusted under 35 U.S.C. 154(b) by 672 days.

(21) Appl. No.: 13/447,840

(22) Filed: Apr. 16, 2012

(65) Prior Publication Data

US 2013/0272338 A1    Oct. 17, 2013

(51) Int. Cl.
*G01K 17/00* (2006.01)
(52) U.S. Cl.
CPC .............. *G01K 17/006* (2013.01); *G01K 17/00* (2013.01)
(58) Field of Classification Search
USPC ................................................ 374/31, 33, 10
See application file for complete search history.

(56) References Cited

U.S. PATENT DOCUMENTS

| | | | |
|---|---|---|---|
| 6,193,413 B1* | 2/2001 | Lieberman | 374/45 |
| 2003/0027354 A1* | 2/2003 | Geli | 436/178 |
| 2003/0186453 A1* | 10/2003 | Bell et al. | 436/147 |
| 2004/0030505 A1* | 2/2004 | Tanaka et al. | 702/31 |
| 2005/0254547 A1* | 11/2005 | Zribi et al. | 374/31 |
| 2010/0290501 A1* | 11/2010 | De Bruyker et al. | 374/31 |

* cited by examiner

*Primary Examiner* — Lisa Caputo
*Assistant Examiner* — Nasir U Ahmed
(74) *Attorney, Agent, or Firm* — Stephen E. Zweig

(57) ABSTRACT

Methods and devices for improved membrane-based microcalorimeters are disclosed. The sample mixing speed or "temporal addenda" of the calorimeter can be improved using membranes with patterned hydrophilic and hydrophobic regions, oscillating droplet squeezing methods, and textured membrane surfaces with ridges designed to facilitate rapid mixing. The thermal coupling between the membranes and the other calorimetric addenda can be minimized by exposing the back side of the calorimetric membrane to a vacuum, while keeping the front side exposed to a humidified environmental chamber. Specially shaped, membrane associated heat-transfer-elements can help the system accurately monitor substantial portions of the sample. These elements, in conjunction with the position of the edge of the sample, can be designed to minimize inaccuracy due to edge evaporation effects. These improvements, which may be applied either individually or collectively, can reduce the distorting effect that slow mixing, addenda, thermal fluctuations, and edge effects have on microcalorimetric measurements.

31 Claims, 6 Drawing Sheets

METHODS AND SYSTEMS FOR IMPROVED MEMBRANE BASED CALORIMETERS

BACKGROUND OF THE INVENTION

1. Field of the Invention

This invention is in the field of microcalorimeter methods and devices.

2. Description of the Related Art

Essentially all chemical and biological reactions either release heat to the surrounding environment, or alternatively absorb heat from the surrounding environment. Thus devices and methods that can precisely perform thermodynamic measurements to determine this heat release or heat absorption are useful for obtaining more information about these reactions.

Although chemical reactions can often result in the release of large amounts of heat to the environment or absorption of large amounts of heat from the environment, biological reactions are often considerably more subtle. This is because many biological reactions of interest involve large molecules, which on a molar level are present in comparatively low amounts in typical samples. Additionally, because the binding forces involved often are comparatively weak, generally only small amounts of heat is generated or absorbed per molecular interaction. Biological molecules also tend to be difficult to obtain, and thus typically only small quantities are available for analysis. As a result, there was and is a need for ever more sensitive calorimeters, in particular microcalorimeters which can accurately measure the thermodynamic properties of such subtle interactions.

One of the problems that impacts all calorimeter designs is that the surrounding mass and heat capacity of the calorimeter instrument itself (usually referred to as the device addenda) tend to interfere with and degrade the various sample thermodynamic measurements. Thus as a general rule for this field, the smaller the amount of addenda (relative to the sample of interest) the better.

Denlinger et. al., in the article, "Thin film microcalorimeter for heat capacity measurements from 1.5 to 800K", Review of Scientific Instrumentation 65(4), April 1994, pages 946-959 disclosed the utility of using thin films (membranes), composed of materials such as amorphous silicon nitride, as the basis substrate for producing improved microcalorimeters. Here the very thin sample supporting membrane provides a very small amount of addenda relative to the sample size, and this in turn allows for a more sensitive device.

In a further improvement of the thin film membrane method, in patent application Ser. No. 09/336,668 (since issued as U.S. Pat. No. 6,193,413), "System and method for an improved calorimeter for determining thermodynamic properties of chemical and biological reactions", the contents of which are incorporated herein by reference, the present inventor described a novel system and method for an improved calorimeter for determining thermodynamic properties of biological and chemical reactions. The inventor's earlier application disclosed a sandwich-like microcalorimeter system formed from two thin amorphous membranes, each anchored to frames which could move relative to each other. In this system, usually thermometers and heaters were placed on one side of a thermal conduction layer mounted on the central portion of each membrane, forming two microcalorimeters, and the membranes and their supporting frames were then placed in a humidified environmental chamber.

According to the methods of application Ser. No. 09/336,668, two samples (first and second samples, often aqueous samples of sub-milliliter volume), are placed on the membranes of the two microcalorimeters. The heaters on each membrane heat the two samples, and the attached thermometers or temperature sensors then determine the heat capacity of each sample. The samples are then mixed by sandwiching the two microcalorimeters, and this mixing in turn causes a binding reaction to occur. The '668 system could also determine the enthalpy of the binding reaction by measuring the amount of heat liberated. The Ser. No. 09/336,668 system would then determine the heat capacity of the mixed sample by using the heaters to again heat the mixed sample, and again measure the temperature change of the sample using the temperature sensors. Various methods of using this data to determine a molecular binding constant were also disclosed.

Although the system and method of Ser. No. 09/336,668 thus represented an improvement over earlier microcalorimetric methods, there remains a need for ever more sensitive and more accurate microcalorimetric systems and methods.

BRIEF SUMMARY OF THE INVENTION

In the present disclosure, the thin film membrane system and methods of Denlinger and the inventor's previous Ser. No. 09/336,668 application are extended still further.

As per Ser. No. 09/336,668, the present invention may also utilize the concept of using a sandwich of two thin-film microcalorimeters, which may be formed from thin amorphous silicon nitride membranes (or other type membranes) anchored to frames, and which may be created upon silicon wafers using fabrication techniques adapted from the microelectronics industry. Also as per Ser. No. 09/336,668, the present invention may utilize a humidified environmental chamber designed to minimize sample evaporation. The invention may also utilize high sensitivity, low-thermal mass, resonator based temperature sensors.

However the present invention is also based, in part, on the insight that just as the mass and heat capacity of the surrounding calorimetric device (the addenda) can complicate and distort thermodynamic measurements, so too when two mixed samples are involved, the speed of mixing is another "temporal addenda" factor that can complicate and distort thermodynamic measurements. Here when a combined sample is formed from two internally pre-mixed samples, ideally the two samples should mix together both completely and instantly, producing a short but intense pulse of thermodynamic activity, and this short but intense pulse will dominate over any system noise, allowing an accurate measurement. To the extent that two samples do not mix completely or instantly, but rather mix incompletely and more slowly, the pulse of thermodynamic activity will be less intense, and thus be more difficult to discern over any system noise.

Thus the present invention teaches additional methods and devices designed to promote high-speed mixing of very small liquid samples, thus producing more accurate measurements over prior art methods and devices.

The invention is also based, in part, on the insight that it is desirable to further thermally isolate the membrane from the thermal distorting effects of the surrounding calorimetric apparatus addenda by configuring the membrane and holder arrangement so that the side of the membrane facing away from the environmental chamber and sample is exposed to either a vacuum, or a low thermal conductivity gas such as Xenon.

The invention is also based, in part, on the insight that although the low heat capacity of thin membranes is generally advantageous for microcalorimetric methods and devices, in some situations, it is useful to further modify the thermal properties of the thin membranes to essentially generate efficient, if very low thermal mass, "heat pipes" (e.g. high efficiency, low mass, thermal conductors affixed to the membrane) to convey thermal changes induced by the mixing of small samples from one part of the membrane to another part. In particular, such low thermal mass heat conductors can be fashioned to do a number of useful functions, such as to focus thermodynamic changes from mixed samples in a manner that, on the one hand can provide better thermal averaging across the diameter or spatial extent of the sample, and on the other hand can also be constructed so as to avoid thermal error sources induced by evaporation of the sample to the outside environment at the outer edges (boundaries) of the sample.

Note, however, that these thermal "pipes" or conductors are not a requirement for isolating the environmentally caused "evaporation noise" from the measurement. Rather, the edge of the sample just needs to be far enough away from any of the thermal conduction area elements so that the edge of the sample is effectively isolated from the sensor during the measurement period(s).

As will be discussed, these various techniques (e.g. the improved higher speed mixing techniques, vacuum thermal isolation techniques, and improved membrane thermal conductor techniques) may be combined in various combinations, as desired, to produce more accurate microcalorimetric measurements.

DETAILED DESCRIPTION OF THE INVENTION

Unless as otherwise specified, it may be generally assumed that the devices and methods, including thermodynamic calculation methods, previously described in application Ser. No. 09/336,668 incorporated herein by reference, may be used to practice at least some embodiments of the present invention.

Thus, for example, the membrane may be fabricated from various materials such as thin amorphous silicon nitride, silicon carbide, and other materials, may use a silicon frame, and may be fabricated on a silicon wafer. Suitable membrane dimensions thus will often include a 0.5×0.5 cm or less membrane supported by a 1×1 cm or less silicon wafer. Even smaller membrane dimensions, such as 2 mm×2 mm, or dimensions below 1.5×1.5 mm dimensions may be used. The membrane may be relatively thin, such as 180 nanometers thick.

Alternatively, and in contrast to Ser. No. 09/336,668, the membrane may also be fabricated to be thicker than 180 nanometers to enable the membrane to cope with pressure differentials when one side is exposed to a vacuum, and the other side is exposed to the higher than vacuum pressures of the environmental chamber.

As per Ser. No. 09/336,668, various types of heaters, such as metal heaters (e.g. nickel resistance-type heaters) may be attached or formed on the frame side of the membrane by standard microelectronic fabrication and silicon micromachining techniques. Additionally, various types of temperature sensors (thermometers), including resonant-thermometers that rely on measuring the resonant frequency of an acoustic wave may be used, as per Ser. No. 09/336,668. The humidifying environmental chamber and piezoelectric-actuator-based membrane/membrane frame movement apparatus of Ser. No. 09/336,668 may also be used in some embodiments of the present invention. The Ser. No. 09/336,668 methods of performing measurements and calculations of heat capacity, entropies, and enthalpies of the reaction various reactions may also be used.

Figure 1:
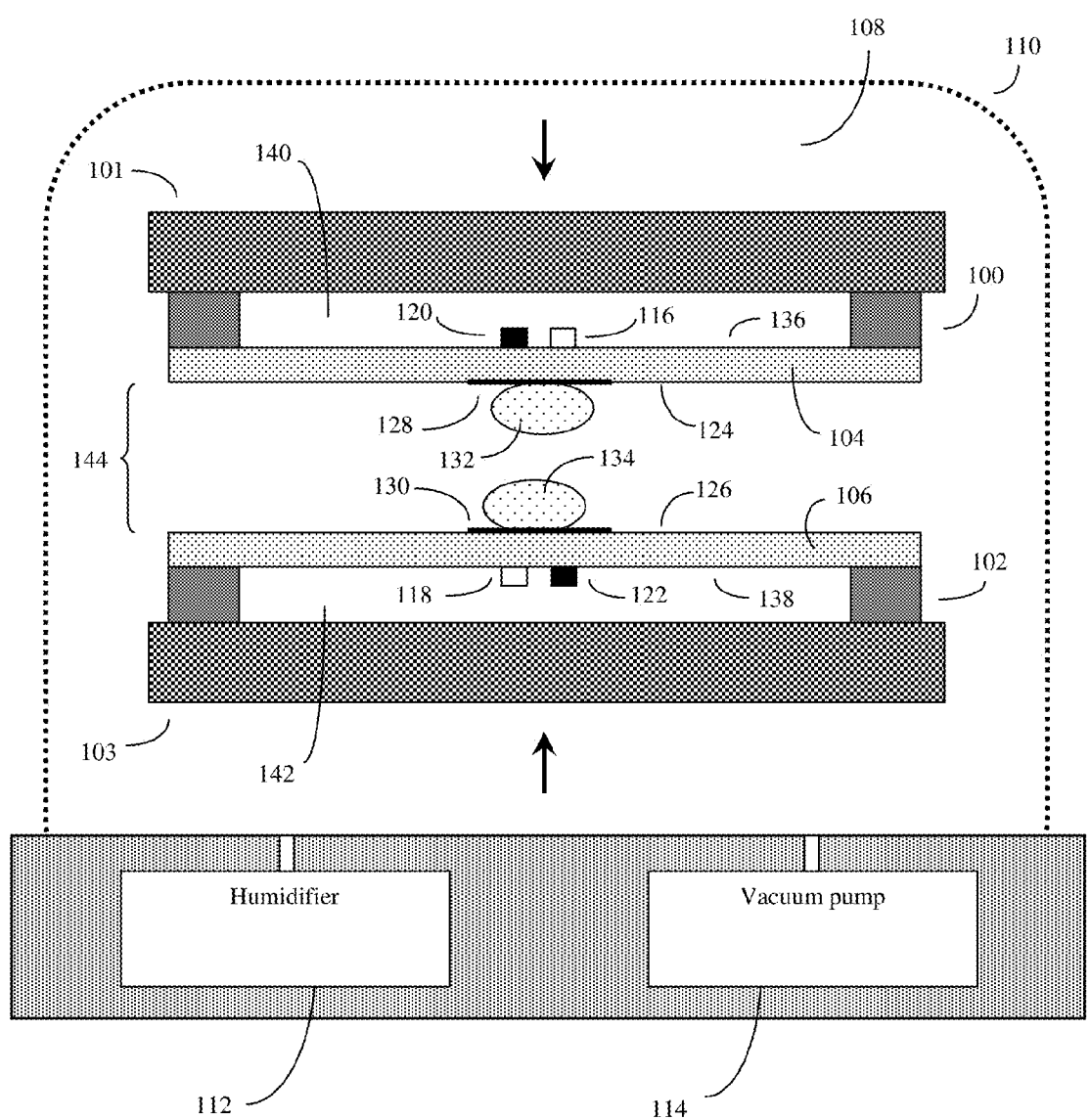
FIG. 1 shows an overview of the sandwich type membrane microelectronic calorimeter and surrounding environmental chamber.

FIG. 1 shows an overview showing a cross section of the top (or first) supporting frame, the bottom (or second) supporting frame, and the two membranes (104), (106) of the microelectronic calorimeter. Note that the use of "top" and "bottom" membranes is arbitrary, and is not intended to show any particular relationship to gravity. In alternative embodiments, the two membranes may be oriented sideways relative to gravity, or even operated in a weightless environment.

The two membranes (104), (106), often formed from amorphous silicon nitride or other material (e.g. thin polyimide), face towards each other (in opposition) and away from their supporting frames, and are exposed to the gas or vapor environment (108) of an environmental chamber (110). This environment may be produced, for example, by the actions of a humidifier device (112) and a vacuum pump device (114). The general idea is keep the vapor pressure (e.g. pressure of $H_2O$ or other solvent components in the sample) in the chamber high enough to prevent sample evaporation, but otherwise remove the effects of gases, such as nitrogen, and often oxygen as well, that do not prevent sample evaporation, thus reducing thermal transfer from the sample to the environmental chamber gas environment.

The faces of the membranes facing the holes in their respective supporting frames are usually coupled to at least one thermometer (116), (118), and heater (120, 122). Most of the environmental chamber faces of the membranes are typically coated with a substantially hydrophobic coating (124), (126) (this can extend beyond the membrane over the frame on the environmental chamber faces). However the center of the environmental chamber faces of the two membranes (128), (130) are usually coated by a center hydrophilic region, often by using polyethylene glycol (PEG) or other hydrophilic material. The net result is that the center hydrophilic region(s) (128), (130) are then surrounded by a substantially hydrophobic coating (124), (126).

To use the microcalorimeter, the environmental chamber (110) is typically first equilibrated with a gas or vapor, such as water vapor, selected so that liquid samples placed on the membrane surface will not substantially evaporate during the course of the analysis. Small amounts of sample, such as droplets of liquid samples (132), (134), are placed in on the hydrophilic regions (128), (130) of both membranes (104), (106). Thus the top or first membrane (104) gets a top or first sample (132), and the bottom or second membrane (106) gets a bottom or second sample (134). Because the liquid samples (132), (134) are placed on hydrophilic zones (128), (130) surrounded by substantially hydrophobic annulus or regions (124), (126), hydrophilic-hydrophobic forces constrain the liquid droplets (132), (134) to remain in the center hydrophilic regions (128), (130).

Often the heat capacity of both the top and bottom sample (132), (134) will then be determined by, for example, applying a measured amount of heat using the heaters (120), 122), and determining the subsequent change in temperature using the temperature sensors (116), (118).

These heaters (120) (122) and temperature sensors (116), (118) may, for example, be located at or near the face of the membrane (136), (138) facing the holes (140), (142) in the two supporting frames (100), (102), and often will be located directly opposite or underneath of the center hydrophilic portion of the membrane (located on the other side) (128), (130). The two supporting frames in turn will often be held by frame supports (e.g. a "chuck" clamp) (101), (103). Since the sample droplets (132), (134) will preferentially adhere to the central hydrophilic portions of the two membranes (128), (130), and since the membranes (104), (106) will usually be chosen to be very thin, so as to readily conduct heat to and from the liquid sample(s), this configuration thus places the heater (120), (122) and temperature sensor (116), (118) as close to the samples (132), (134) as possible, separated only by the thickness of the membranes (104), (106).

Once the samples have been applied, and the initial thermodynamic characterization has been done, the gap distance (144) between the top membrane and the bottom membrane is then reduced, usually with precise automatic motion control equipment (not shown), such as the previously described piezoelectric actuator system or other system.

In some embodiments, to improve sensitivity and signal to noise ratio by reducing the amount of heat energy lost to the surrounding calorimeter equipment, the face of the membrane facing towards the hole in the supporting frame may be exposed to either a vacuum or thermally isolating gas such as Xenon. This embodiment is shown in more detail in FIG. 2. Here, to emphasize the fact that the face of the membrane facing the hole in the supporting frame may be exposed to a vacuum, while the face of the membrane facing the environmental chamber is instead exposed to the gas or vapor environment of an environmental chamber, this gas or vapor (220), previously drawn in white as (110), is here shown by the sparse dot texture pattern, while the vacuum is shown by the pure white nature of the space between the membrane, the hole in the frame (140), (142).

To do this, in one embodiment a hollow interior (202), (204) in the frame supports or "chuck" (101A), (103A) may be used, possibly with the aid of flexible hoses (206), (208) or other fixtures to help conduct the vacuum from a vacuum pump (210) (which may be a different pump than the environmental chamber vacuum pump (114)). Note that the convention of drawing the environmental chamber gas or vapor as a field of dots is used only for FIG. 2. In the other figures, although the environmental chamber gas or vapor is not explicitly drawn, it should generally be assumed that the face of the membrane facing away from the frame is exposed to the environmental chamber gas or vapor, and the face of the membrane facing towards the hole in the frame may be exposed to whatever gas or vapor, vacuum, or temperature isolating gas as may be selected by the calorimeter manufacturer and/or operator.

Figure 2:
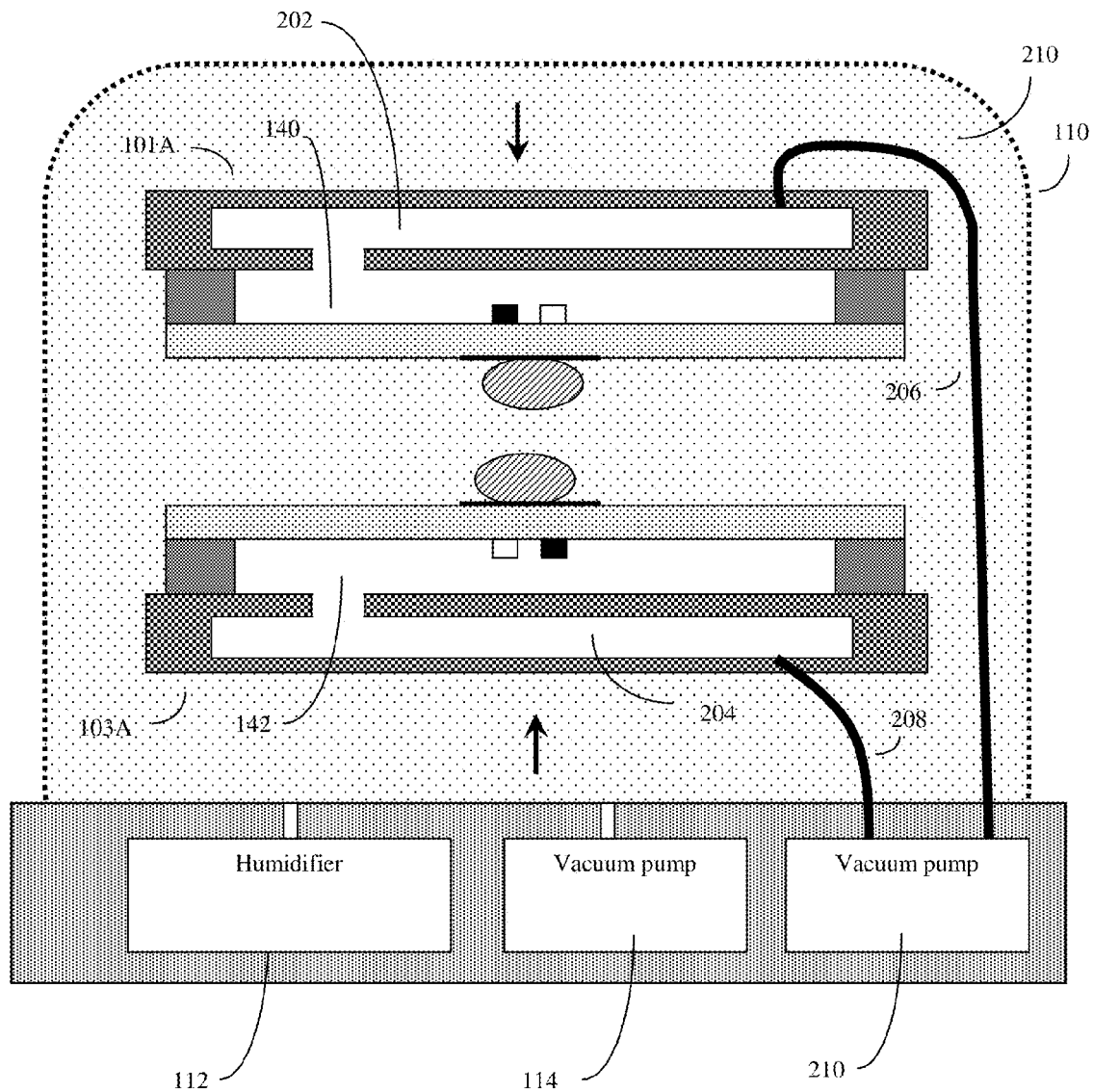
FIG. 2 shows a modification of the device of FIG. 1, showing that although the sample receiving sides of the two membranes may remain exposed to the humidified environment of the environmental chamber, the opposite support frame facing sides of the two membranes may instead be exposed to a vacuum or low thermal conductivity gas environment, thus further thermally isolating the membrane and sample from the surrounding addenda.

Note that although in FIG. 2, the frame supports or "chuck" (101A), (103A) are shown making contact with the vapor on the underside of the frame supports (101A), (103A), in alternative and often preferable embodiments, the chuck may be designed so that the bottom of the frame supports/chuck in turn rests on a solid support and, thus the bottom of the frame supports/chuck may not be exposed to the vapor. Note also that the various electrical connections will often be routed through the frame support/chuck (not shown).

In some embodiments, to mitigate the any effects that membrane bending caused by pressure difference may have on the temperature sensor (which in particular may impact resonator based temperature sensors), an optional membrane strain relief element may also be provided. Here, for example, this strain relief element may be a stiff, non-bendable material such as diamond, Silicon Carbide, Sapphire, or Aluminum Nitride that may be attached to the center of the membrane under the first heat conductor. In addition, this strain relief element will itself help minimize the amount of membrane deflection when the membrane has a pressure difference across it.

Temperature sensors: as previously discussed, it is often useful to employ resonator based temperature sensors (thermometers) (116), (118), which operate by determining the resonant frequency of a generated acoustic wave (this resonant frequency changes with temperature). Here, because the surrounding air in the frame hole (140), (142) can dampen these oscillations, use of vacuum on the thermometer side (e.g. the hole in the frame facing side) (140), (142) of the membrane is useful. This is because surrounding air can act to dampen oscillations, which in turn decrease the accuracy of the temperature measurements. By contrast, the vacuum avoids or minimizes this effect.

As previously discussed, in some embodiments, it may be useful to fabricate the membrane region of the calorimeter on a wafer, such as a silicon wafer. Such methods are often preferred, because the technology of silicon wafer chemistry and micromachining is generally both well understood and highly developed.

Figure 3:
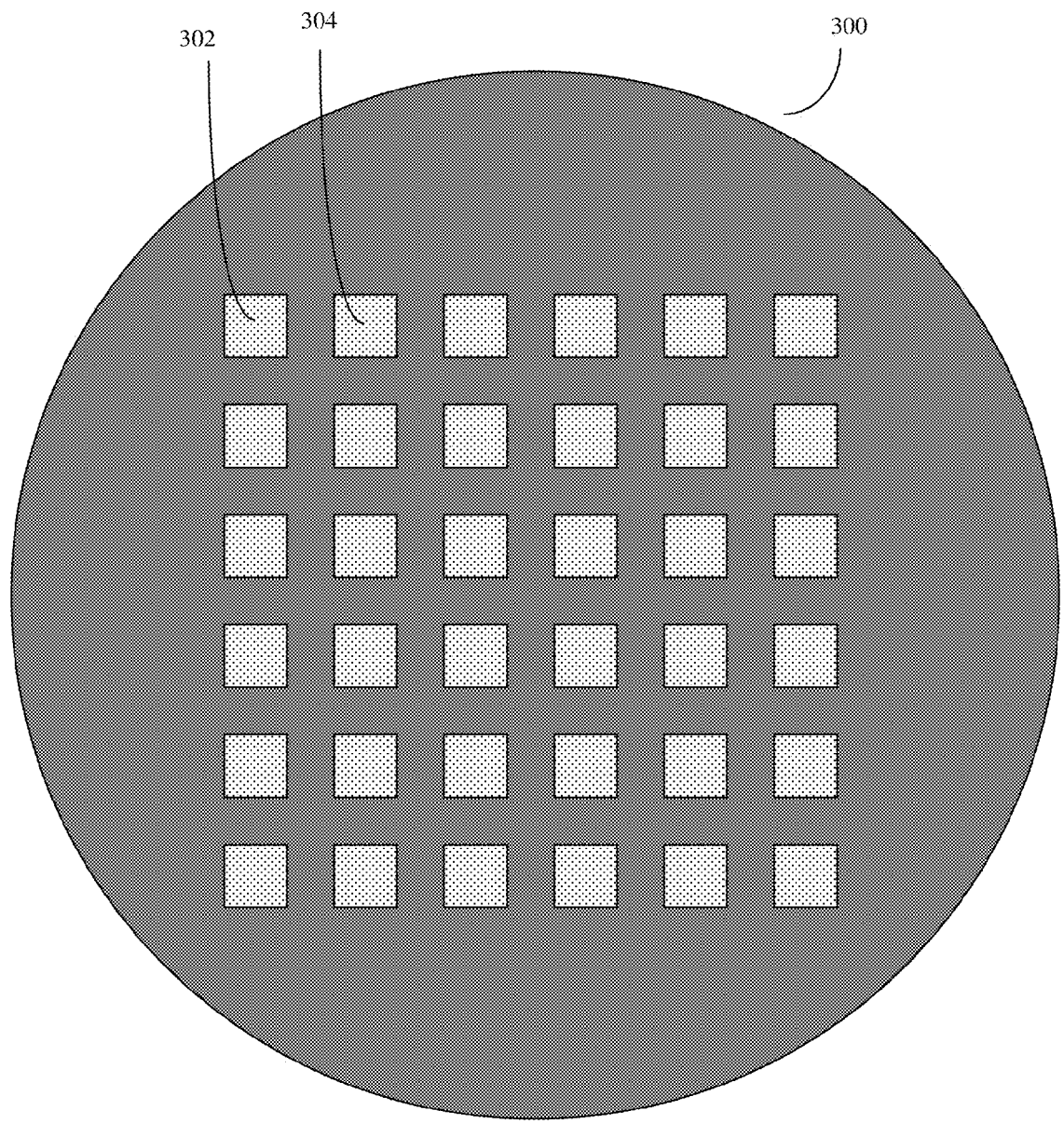
FIG. 3 shows an example of how the microelectronic calorimeter membranes and ancillary devices (e.g. sensors, heaters, hydrophilic regions, hydrophobic regions, and thermal conductivity regions) may be fabricated on a support, such as a silicon wafer.

A diagram of a wafer showing this type of fabrication method is shown in FIG. 3. The silicon wafer, which can also serve as the membrane support frame (in some embodiments, the wafer may be optionally further cut and processed for this), is shown as (300). To simplify the fabrication process, in situations where the top membrane has a different topographical structure from the bottom membrane, then the top and bottom (e.g. first and second) membranes may, for example be fabricated in an alternating pattern (302), (304), thus producing both membrane topographies with a single wafer production process. Alternatively two different wafer designs, one producing only top membrane topographical designs, and one only producing bottom membrane topographical designs may be used. These topographical designs will be discussed in further detail shortly.

As previously discussed, after the samples (again often aqueous/liquid samples in droplet form) have been placed onto the hydrophilic regions of both membranes (128), (130), the device's motion control equipment will then reduce the gap distance (144) between the top membrane (104) and the bottom membrane (106) so that eventually, at a first gap distance, the top sample (132) contacts the bottom sample (134), creating a combined sample. In the early stages of this gap reduction process, the combined sample will initially remain confined to the hydrophilic regions of both membranes, but eventually as the gap distance is reduced still further (second gap distance), the combined sample will be squeezed onto the substantially hydrophobic regions (124), (126) (surrounding the central hydrophilic region) of both membranes. The device's top and bottom thermometers (116), (118) and heaters (120), (122) can be used to measure the thermodynamic properties of the top, bottom and combined sample at any point during this process as desired.

Although, once the gap (144) is narrow enough so that the top sample contacts the bottom sample, the two samples are technically combined, the problem of getting fast and adequate sample mixing remains. As previously discussed, ideally the two samples should instantly mix in zero time, however in practice often the mixing time will be slower than desired, and this in turn can adversely affect the accuracy and sensitivity of the measurement.

Figure 4:
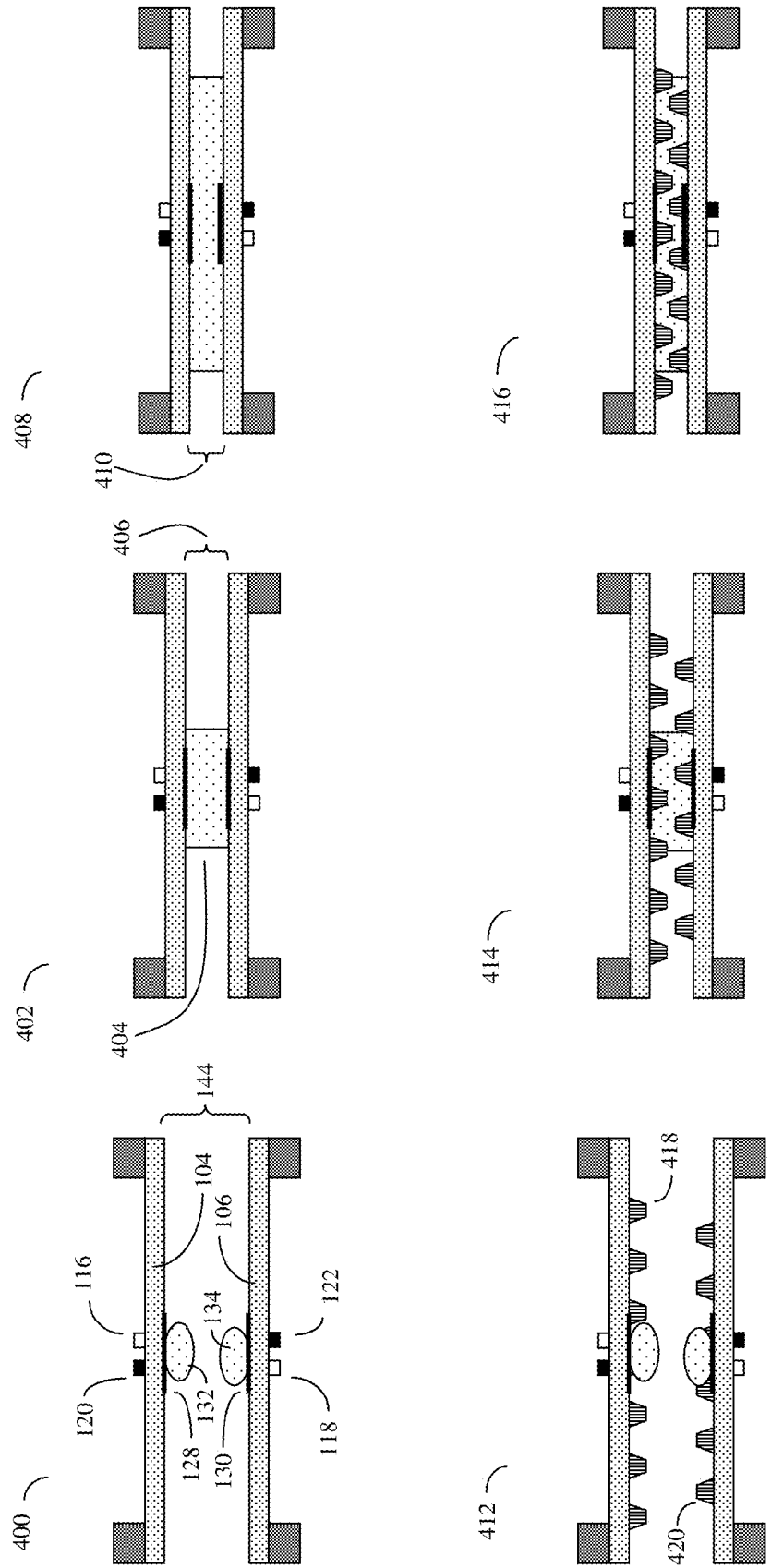
FIG. 4 shows a side view illustration of how, according to the invention, samples, such as liquid sample droplets, may be confined to the central region of the membrane by manipulating the hydrophilic and hydrophobic properties of the membrane, and then induced to rapidly mix by sandwiching the upper and lower membrane together, often followed by rapid oscillation. In some embodiments, one or both membranes may be additionally textured by various patterns of ridges to further induce rapid sample mixing.

FIG. 4 (400), shows a simplified drawing of the top and bottom membranes (104), (106), heaters (120), (122), temperature sensors (116), (118), support frames and other features including the central hydrophilic portions (128), (130) and the sample droplets (132), (134), and the gap (144) previously shown in more detail in FIGS. 1 and 2. For simplicity, the surrounding environmental chamber and other ancillary equipment is not shown.

In FIG. 4, as before, the liquid sample droplets (132), (134), may be confined to the central hydrophilic region of the membranes (128), (130). However as the gap (144) between the top and bottom membrane (104), (106) is reduced, the two different liquid samples merge creating a combined sample, shown in (402) as (404). In particular, as the gap (406) becomes still smaller, the combined sample is squeezed out of the hydrophilic regions (128), (130) and onto the surrounding hydrophobic portions of the membrane (see FIG. 1, 124, 126). As shown in (408), a still smaller gap (410) creates even more squeezing and further combined sample spreading onto the hydrophobic portions of the membrane. Note however, that if this process is reversed, and the gap (408) (410) widened, due to the hydrophobic forces and central hydrophilic zone, the combined sample would ultimately migrate back away from the hydrophobic zones and once again become localized to the hydrophilic regions (128), (130).

Here the mixing of the upper and lower samples (132) (134) can be facilitated or sped up by, after first manipulating the hydrophilic and hydrophobic properties of the membrane, sandwiching the upper and lower membrane together, and rapidly oscillating the gap distance (144), (406), (410).

In embodiments, shown in (412), (414), and (416), one or both membranes may be additionally textured by various patterns of ridges (418), (420) to further induce rapid sample mixing.

Thus often to facilitate mixing, the device's motion control equipment (e.g. piezoelectric actuators, voice coils, and the like) may be set to move the top membrane and bottom membrane relative to teach other in an oscillating pattern to facilitate mixing of the combined sample.

Figure 5:
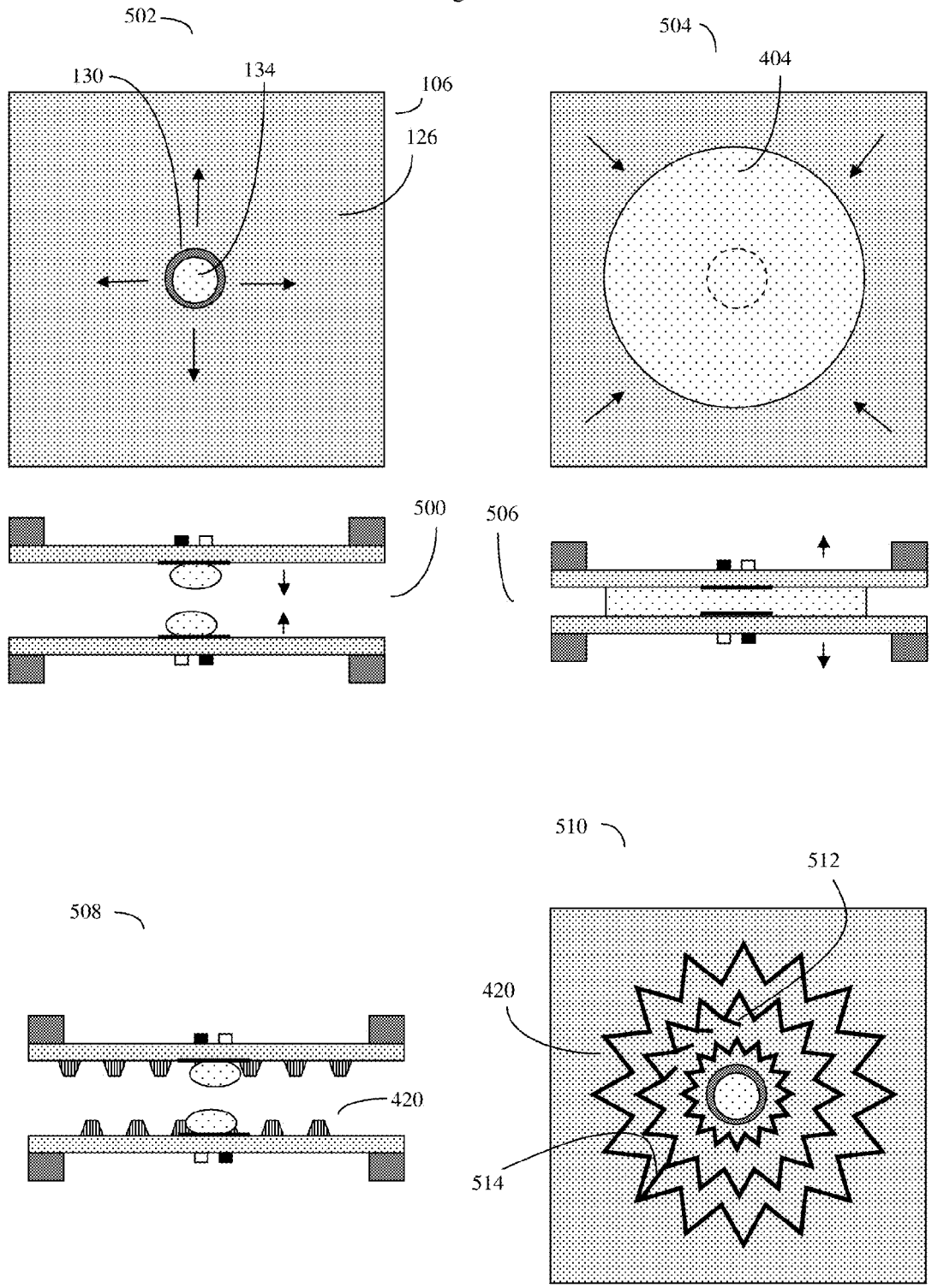
FIG. 5 shows a top view illustration of how, according to the invention, the mixed sample droplet that is initially confined to the central portion of the membrane sandwich by a hydrophilic central zone surrounded by a hydrophobic annulus or exterior, can be mixed by alternately squeezing the droplet between the two membranes, and then releasing the droplet, causing the droplet to alternately expand and contract from the surrounding hydrophobic zone. The illustration also shows an example of various membrane ridge patterns that can also be used to further promote rapid sample mixing.

This oscillation technique is shown in more detail in FIG. 5. Here, for example, the gap distance (144), (406), (410) may be varied between a first greater distance where the sample may rebound to the original hydrophilic region, and a second lesser distance where the sample substantially spreads over the surrounding hydrophobic regions as well. These distances will, of course vary with the geometry of the device and the size of the sample.

Here (500) shows the system prior to the first squeezing from a side view, where the original sample droplets have not mixed yet, and (502) shows a top view of the same system, looking down at the bottom membrane. By contrast, (504) shows a side view of the system during the first squeezing from the top, where the combined sample (404) has now expanded beyond the hydrophilic region (130) and into the surrounding hydrophobic region (126). (506) shows a side view of this first squeezing.

Thus in some configurations, the gap distance (144), (404), (410) may, as an example, oscillate between a first gap distance of approximately 200-350 microns at the high end, and a second distance less than a tenth of the first distance, such as about 35 to 5 microns. The oscillation frequency can vary, but often the time between oscillations will be about 100 milliseconds or less. The actual values will, of course, vary greatly depending on the geometry of the setup and the size of the samples.

In some embodiments, a pause at some intermediate gap distance may facilitate the mixing of sample components that have very high mixing rates relative to other sample components. For example, in current state of the art calorimetry, which uses spinning propellers or stir bars for mixing purposes, the sample solutions to be mixed often contain both slower mixing larger macromolecules, and smaller fast mixing ions. These solutions are typically dialyzed so that the ion contents of both are equilibrated prior to mixing.

However if the ion concentrations of the sample solutions to be mixed are slightly different, after mixing the heat associated with the equilibration of these different ion concentrations would contribute to an erroneous measurement. This is because these mixing mechanisms do not have the ability to take advantage of the different mixing rates of the various components within the sample solution.

In contrast, given that the smaller ions may have mixing rates that are on the order of 100× faster than the larger macromolecules, combining the two sample solutions by a multiple step process of different gap distances and various time pauses can be useful. Here, a first intermediate gap distance can facilitate the pre-equilibration of the smaller ions before any substantial mixing of the larger macromolecules begins. Thus using a first intermediate gap distance can reduce or eliminate artifacts caused by ion concentration differences during the measurement period. Here, for example, a first gap distance of initial sample combination can be followed by a second gap distance (e.g. 50-100 microns) and a time pause to let the quickly diffusing ions mix. Once the quickly moving ions have mixed, the gap distance can be reduced still further, and time can be allocated to allow the slower moving large macromolecules to mix.

As previously discussed, in addition to oscillation mixing methods, the environmental chamber faces (124), (126) of one or both membranes (104), (106) may additionally be textured or patterned with various raised ridges (418), (420) disposed to facilitate mixing of the two components (e.g. top droplet and bottom droplet) of the combined sample. Examples of such raised ridges (420) are shown in FIG. 4 and FIG. 5. FIG. 5 shows the device with ridges (420) in side view (508), while in (510), the top view of the bottom membrane, showing one example of a ridge pattern from above, is also shown.

The purpose of the ridges is, as the two membranes are pressed closer and closer towards each other by the motion control equipment, to force the top part of the liquid sample to intermix with the bottom portion of the liquid sample. In particular, as the gap becomes very small (e.g., as the gap distance 144 is reduced from the larger first gap distance to a smaller second gap distance such as 410), the ridges will create gradients of force as the samples traverse the ridges outwardly or inwardly from the center, depending on the relative motion of the microcalorimeters, facilitating mixing.

Many types of textured or patterned ridges are possible. Although FIG. 4 and FIG. 5 show an example of ridges (418), (420) on both the top and bottom membranes, in alternate configurations, the ridges need only be on one membrane or the other. The ridges can be in many possible patterns, and may, as shown in FIG. 5, contain anisotropic elements or pattern sections as well (512). This can help to introduce a component of flow that deviates from a straight line radial flow. That is, the anisotropic elements can in turn produce anisotropic flow patterns in the lateral flow of the top and bottom samples (e.g. combined sample) during mixing. Generally the ridges (420) may be between about 1 to 20 microns high, and the width of the raised ridges will usually be between about 1 to 200 microns wide (these can extend beyond the membrane over the frame on the environmental chamber faces).

In some embodiments, when such ridges are used to facilitate mixing, and the membranes are additionally exposed to a vacuum on one side (as previously discussed) to improve thermal isolation and accuracy, the ridge pattern may additionally be used to also help stabilize the membrane and help prevent pressure distortions. Here for example, there may be ridge connections between successive ridge patterns (514) for such stabilization purposes.

The ridges may be formed by lithography, electroplating, or other process. The patterns can be made of different materials, such as a photoresist or polymer material, or can even be made from metal. Generally however non-metallic materials like glass are preferred because the ridges should ideally be thermally isolating. The sides of the ridges can also be formed in a variety of shapes as well.

Heat Transfer Devices

For some applications, it is also useful to configure the membranes so as to better control the distribution of heat in the sample during the process.

Figure 6:
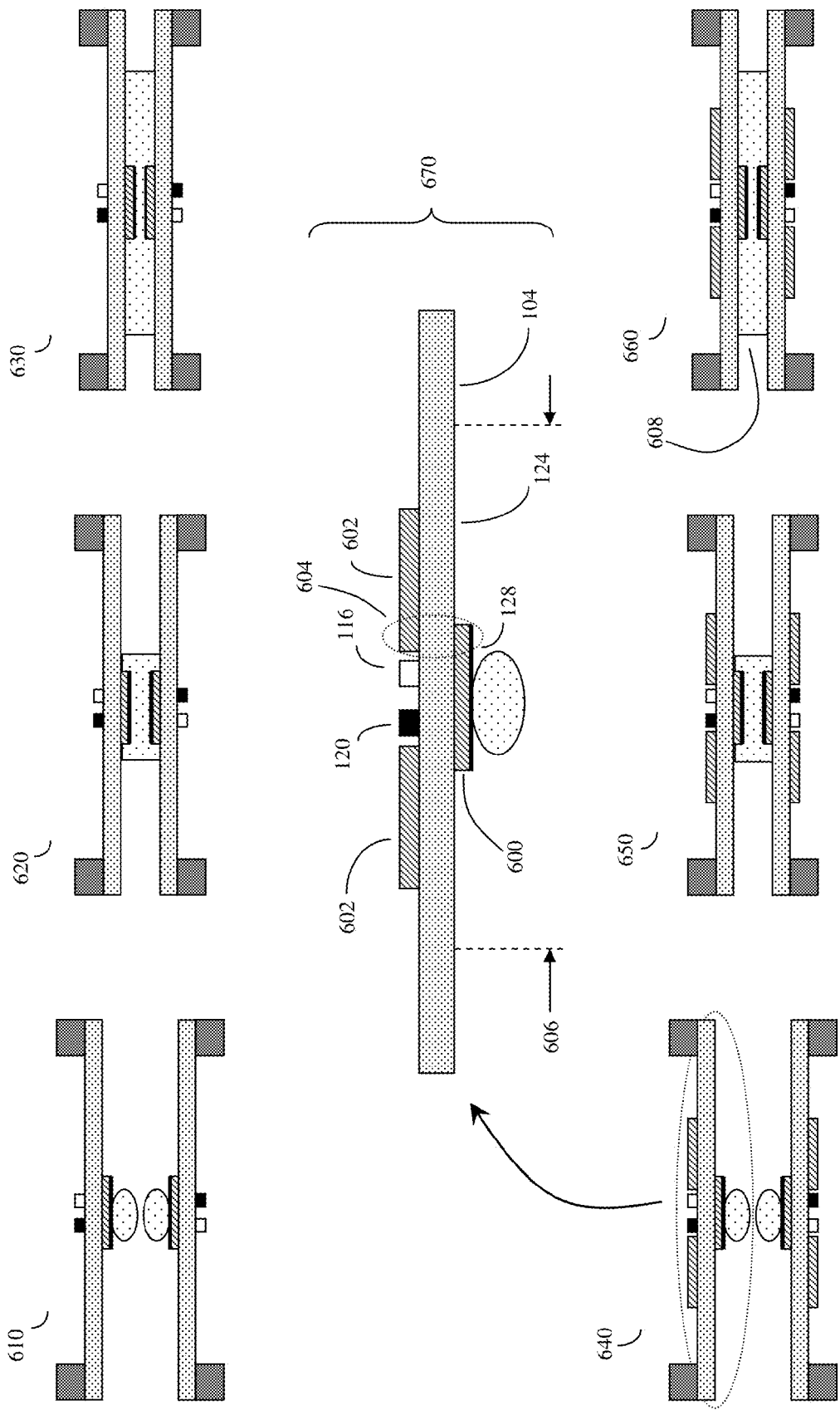
FIG. 6 shows an example of how "heat pipes" (that is membrane affixed zones with low thermal mass but high heat transfer efficiency, such as gold films), may be formed on various regions of the membranes, and used to direct and focus reaction thermodynamic changes to and from the device's heaters and temperature sensors.

One way to get such better heat control is shown in FIG. 6. FIG. 6 shows two different heat conductor configurations, as well as a magnified view of a portion of the top membrane (670) showing these heat conductor configurations in more detail.

In this method, directly underneath the hydrophilic portions (128), (130) of one or both membranes, there will be a first heat conductor(s) (600). In practice usually the first heat conductor (600) may be formed by first applying a thin coating of gold or other heat conducting material to the center of the membrane, and then the hydrophilic layer (e.g. PEG) (128) may then be applied on top of the heat conductor (600). The heat conductor(s) should ideally be extremely thin so as to have a very low thermal mass, yet conduct heat in a horizontal or lateral direction (i.e. along the face of the membrane) substantially faster than the membrane (104) itself.

These heat conductors (600) can be made of a variety of heat conducting materials. These heat conducting materials include non-metallic heat conductors such as diamond, silicon carbide, aluminum nitride, or a crystalline or polycrystalline heat conductor. Other suitable heat conductors include various metals. Here thin layers of gold are particularly good heat conductors, and in a preferred embodiment, the heat conductors (600) will be formed from a thin layer of gold.

Other heat distribution schemes are also useful. In an alternative configuration that is particularly useful for enthalpy measurements, portions of one or both faces of the membranes facing towards the frame can also have membrane backside heat conductors (second heat conductors) as well (602). These membrane backside heat conductors (602) will often have a carefully designed annular configuration, and will often be designed to be directly opposite (on the other side of the membrane from) the hydrophobic membrane portions (124). In some embodiments, the backside heat conductors (602) may also be designed to somewhat overlap (604) (from the other side of the membrane) with the outer edges of the first heat conductor (600). Put alternatively, the second membrane backside heat conductors may be designed to overlap (604), on the opposite side of the membrane, with a portion of the outer edges of the substantially hydrophilic region (128), but not the inner portion of the hydrophilic region (128).

To avoid edge effects, however, the second heat conductor (602) will generally not extend to the region of the membrane (606), opposite the outer edge of the hydrophobic regions (124), where the droplets would normally extend when the gap is in the second narrow gap distance. The reason for this is that even in a carefully controlled environmental chamber, there will still be some evaporative cooling along the outer edges (608) of the squeezed sample. This evaporative cooling will distort the measurement. As a result, the second membrane backside heat conductor (602) will be designed to stop short of this edge (606), so that any heat that this backside heat conductor (606) picks up from the sample on the other side of the thin membrane will not be distorted by such evaporative edge cooling (608).

Thus when there is both a first heat conductor underneath the hydrophilic layer, and a second membrane backside heat conductor on the other side of the membrane, the thermal flow from squeezed sample will first cross the membrane (104) to the second membrane backside heat conductor (602), laterally flow to the overlap region (605), then back through the membrane (104) to the first hydrophilic region heat conductor (600). From this first hydrophilic region heat conductor (600), the heat will then transfer back through the membrane (104) again and onto the temperature sensor/heater (120), (116).

Conversely, if the heater (120) is used, this heat flow essentially goes in reverse, from the heater (120), across the membrane (104) to the first heat conductor (600), laterally flow out to the outer edges of the first heat conductor to the overlap region (604), through the membrane (104) to the second membrane backside heat conductor (602), where the heat will be distributed by lateral flow underneath the hydrophobic portion of the membrane (124), and then through the membrane again and onto the squeezed sample.

Various permutations of heat conductors (600), (602) may be used, along with different thicknesses, diameters, and gaps (128) as desired. Note that in the configuration shown, the heater (120) and temperature sensor (116) do not make direct contact with heat conductor (602). Rather they are often configured instead to transmit and receive heat energy through the thickness of membrane (104) and with heat conductor (600).

In FIG. 6, (610), (620), and (630) show the progress of the calorimetric measurement using only heat conductor (600). By contrast, (640), (650) and (660) show the progress of the calorimetric measurement using both heat conductor (600) and heat conductor (602). The magnified membrane portion is shown as (670)

The invention claimed is:

1. A method for using a microelectronic calorimeter and environmental chamber system to determine the thermodynamic properties of at least one sample;

said microelectronic calorimeter comprising a top membrane affixed below a hole in a top supporting frame, and a bottom membrane affixed above a hole in a bottom supporting frame, said top frame and said bottom frame separated by a variable gap distance;

wherein for each membrane, the face of the membrane facing away from the frame is exposed to an environmental chamber with a pressure controlled gas or vapor, and wherein for one or both membranes, the face of the membrane facing towards the hole in the frame is coupled to a thermometer and a heater:

wherein the environmental chamber faces of both membranes are coated with a substantially hydrophobic coating;

wherein the center of both environmental chamber faces of both membranes are coated with a substantially hydrophilic coating, thus, for both membranes, producing a center hydrophilic region surrounded by a substantially hydrophobic region such that sample droplets will contract away from the substantially hydrophobic region towards the substantially hydrophilic region;

said method comprising:

placing a top sample on the environmental chamber face of said top membrane on said hydrophilic region, and placing a bottom sample on the environmental chamber face of said bottom membrane on said hydrophilic region;

reducing said gap distance to a first gap distance so that said top sample contacts said bottom sample, creating a combined sample, but said combined sample remains confined to the substantially hydrophilic region of both membranes;

further reducing said gap distance to a second gap distance so that said combined sample is squeezed onto the substantially hydrophobic region of both membranes, using at least one top or bottom thermometer and/or heater to measure the thermodynamic properties of either the top sample, the bottom sample, or the combined sample during said method; and wherein the environmental chamber faces of one or both membranes further comprise a pattern of raised ridges disposed to facilitate mixing of said top sample with said bottom sample when said gap distance is reduced from said first gap distance to said second gap distance.

2. The method of claim 1, wherein the positions of said top frame and said bottom frame thermometers and heaters are located on the face of said membranes opposite said center hydrophilic regions.

3. The method of claim 1, further oscillating said gap distance between said first gap distance and said second gap distance to facilitate mixing of said combined sample.

4. The method of claim 3, wherein said first gap distance is approximately at the distance where said samples first combine, and said second gap distance is less than one half of said first gap distance.

5. The method of claim 1, wherein the center of one or both environmental chamber faces of one or both membranes further comprise a first heat conductor, and said substantially hydrophilic region is located on the environmental chamber sides of said heat conductor.

6. The method of claim 1, wherein portions of one or both faces of the membranes facing towards the frame comprise a second heat conductor such that said second heat conductor is opposite portions of said substantially hydrophobic regions;

wherein said second heat conductor overlaps, on the opposite side of said membrane, a portion of the outer edges of said substantially hydrophilic region, but not the inner portion of said substantially hydrophilic region; and wherein said second heat conductor does not extend to the region of the membrane, opposite the outer edges of said hydrophobic regions, where said droplets would normally extend when said gap is in said second gap distance.

7. The method of claim 1, wherein the height of said raised ridges is between about 1 and 20 microns high, and wherein the width of said raised ridges is between about 1 and 200 microns wide.

8. The method of claim 1, wherein said patterns comprise anisotropic patterns or patterns with anisotropic elements in said patterns that produce anisotropic flow patterns in the lateral flow of said top sample and said bottom sample during mixing.

9. The method of claim 1, wherein, for one or both membranes, the face of the membrane facing towards the frame is exposed to a vacuum through said hole in said top or bottom supporting frames.

10. The method of claim 9, wherein the environmental chamber faces of one or both membranes further comprise a pattern of raised ridges disposed to facilitate mixing of said top droplet with said bottom droplet when said gap distance is reduced from said first gap distance to said second gap distance; and wherein said pattern is further configured to help provide structural support for said membrane against a pressure gradient caused by exposure to vacuum on the face of the membrane facing toward said hole in said frame, and environmental chamber gas pressure on the face of the membrane facing toward the environmental chamber.

11. The method of claim 1, wherein, for one or both membranes, the face of the membrane facing towards the frame is exposed to a gas with a substantially lower thermal conductivity than the gas in said environmental chamber, through said hole in said top or bottom supporting frames.

12. The method of claim 1, wherein said thermometer is a resonator or multiple resonators.

13. The method of claim 1, wherein said membrane additionally comprises a strain relief element.

14. A method for using a microelectronic calorimeter and environmental chamber system to determine the thermodynamic properties of at least one sample;

said microelectronic calorimeter comprising a top membrane affixed below a hole in a top supporting frame, and a bottom membrane affixed above a hole in a bottom supporting frame, said top frame and said bottom frame separated by a variable gap distance;

wherein for each membrane, the face of the membrane facing away from the frame is exposed to an environmental chamber with a pressure controlled gas or vapor, and wherein for one or both membranes, the face of the membrane facing towards the hole in the frame is coupled to a thermometer and a heater:

wherein the environmental chamber faces of both membranes are coated with a substantially hydrophobic coating;

wherein the center of both environmental chamber faces of both membranes are coated with a substantially hydrophilic coating, thus, for both membranes, producing a center hydrophilic region surrounded by a substantially hydrophobic region such that sample droplets will contract away from the substantially hydrophobic region towards the substantially hydrophilic region;

said method comprising:

placing a top sample on the environmental chamber face of said top membrane on said hydrophilic region, and placing a bottom sample on the environmental chamber face of said bottom membrane on said hydrophilic region;

reducing said gap distance to a first gap distance so that said top sample contacts said bottom sample, creating a combined sample but said sample remains confined to the substantially hydrophilic regions of both membranes;

further reducing said gap distance to a second gap distance so that said combined sample is squeezed onto the substantially hydrophobic regions of both membranes;

using at least one top or bottom thermometer and/or heater to measure the thermodynamic properties of either the top sample, the bottom sample, or the combined sample during said method;

wherein the center of one or both environmental chamber faces of one or both membranes further comprise a first heat conductor, and said substantially hydrophilic region is located on the environmental chamber sides of said heat conductor; and wherein portions of one or both faces of the membranes facing towards the frame comprise a second heat conductor such that said second heat conductor is opposite portions of said substantially hydrophobic regions;

wherein said second heat conductor overlaps, on the opposite side of said membrane, the outer edges of said substantially hydrophilic region, but not the inner portion of said substantially hydrophilic region; and wherein said second heat conductor does not extend to the region of the membrane opposite the outer edges of said hydrophobic regions where said droplets would normally extend when said gap is in said second gap distance;

wherein the positions of said top frame and said bottom frame thermometers and heaters are located on the face of said membranes opposite said center hydrophilic regions such that said thermometers and heaters are on the side of the membrane opposite said first heat conductor, but do not make direct contact with said second heat conductor;

and wherein heat conducted by said second heat conductor transfers through said membrane to said first heat conductor, and heat from said first heat conductor transfers through said membrane to at least said thermometers;

wherein heat from the outer edges of said samples, when said gap is in the second gap distance, is thermally isolated from said second heat conductor because said second heat conductor does not extend to the region of the membrane opposite where said droplets would normally extend when said gap is in said second gap distance; and wherein the environmental chamber faces of one or both membranes further comprise a pattern of raised ridges disposed to facilitate mixing of said top sample with said bottom sample when said gap distance is reduced from said first gap distance to said second gap distance.

15. The method of claim 14, further oscillating said gap distance between said first gap distance and said second gap distance to facilitate mixing of said top sample and said bottom sample.

16. The method of claim 14, wherein the height of said raised ridges is between about 1 and 20 microns high, and wherein the width of said raised ridges is between about 1 and 200 microns wide.

17. The method of claim 14, wherein said patterns comprise anisotropic patterns or patterns with anisotropic elements in said patterns that produce anisotropic flow patterns in the lateral flow of said top sample and said bottom sample during mixing.

18. The method of claim 14, wherein, for one or both membranes, the face of the membrane facing towards the frame is exposed to a vacuum through said hole in said top or bottom supporting frames.

19. A system for determining the thermodynamic properties of at least one sample, said system comprising a microelectronic calorimeter and environmental chamber system;

said microelectronic calorimeter comprising a top membrane affixed below a hole in a top supporting frame, and a bottom membrane affixed above a hole in a bottom supporting frame, said top frame and said bottom frame separated by a variable gap distance;

wherein for each membrane, the face of the membrane facing away from the frame is exposed to an environmental chamber with a pressure controlled gas or vapor, and wherein for one or both membranes, the face of the membrane facing towards the hole in the frame is coupled to a thermometer and a heater:

wherein the environmental chamber faces of both membranes are coated with a substantially hydrophobic coating;

wherein the center of both environmental chamber faces of both membranes are coated with a substantially hydrophilic coating, thus, for both membranes, producing a center hydrophilic region surrounded by a substantially hydrophobic region such that sample droplets will contract away from the substantially hydrophobic region towards the substantially hydrophilic region;

wherein said system is configured to accept a top sample applied to the environmental chamber face of said top membrane on said hydrophilic region, and to accept a bottom sample applied to the environmental chamber face of said bottom membrane on said hydrophilic region;

said system further configured to be capable of reducing said gap distance to a first gap distance so that said top sample contacts said bottom sample creating a combined sample, but said combined sample remains confined to the substantially hydrophilic regions of both membranes;

said system further configured to substantially reduce said gap distance to a second gap distance so that combined sample is squeezed onto the substantially hydrophobic region of both membranes, said system further configured to use at least one top or bottom thermometer and/or heater to measure the thermodynamic properties of either the top sample, the bottom sample, or the combined sample at one or more times after said samples are applied to said membranes; and wherein the environmental chamber faces of one or both membranes further comprise a pattern of raised ridges disposed to facilitate mixing of said top sample with said bottom sample when said gap distance is reduced from said first gap distance to said second gap distance.

20. The system of claim 19, wherein the positions of said top frame and said bottom frame thermometers and heaters are located on the face of said membranes opposite said center hydrophilic regions.

21. The system of claim 19, wherein said system is configured to enable further oscillation of said gap distance between said first gap distance and said second gap distance to facilitate mixing of said combined sample.

22. The system of claim 21, wherein said first gap distance is approximately at the distance where said samples first combine, and said second gap distance is less than one half of said first gap distance.

23. The system of claim 19, wherein the center of one or both environmental chamber faces of one or both membranes further comprise a first heat conductor, and said substantially hydrophilic region is located on the environmental chamber sides of said heat conductor.

24. The system of claim 19, wherein portions of one or both faces of the membranes facing towards the frame comprise a second heat conductor such that said second heat conductor is opposite portions of said substantially hydrophobic regions;
wherein said second heat conductor overlaps, on the opposite side of said membrane, a portion of the outer edges of said substantially hydrophilic region, but not the inner portion of said substantially hydrophilic region; and
wherein said second heat conductor does not extend to the region of the membrane, opposite the outer edges of said hydrophobic regions, where said droplets would normally extend when said gap is in said second gap distance.

25. The system, of claim 19, wherein the height of said raised ridges is between about 1 and 20 microns high, and wherein the width of said raised ridges is between about 1 and 200 microns wide.

26. The system of claim 19, wherein said patterns comprise anisotropic patterns or patterns with anisotropic elements in said patterns that produce anisotropic flow patterns in the lateral flow of said top sample and said bottom sample during mixing.

27. The system of claim 19, wherein, for one or both membranes, the system is configured to enable the face of the membrane facing towards the frame to be exposed to a vacuum through said hole in said top or bottom supporting frames.

28. The system of claim 27, wherein said pattern is further configured to help provide structural support for said membrane against a pressure gradient caused by exposure to vacuum on the face of the membrane facing toward said hole in said frame, and environmental chamber gas pressure on the face of the membrane facing toward the environmental chamber.

29. The system of claim 19, wherein said system is configured, for one or both membranes, to enable the face of the membrane facing towards the frame to be exposed to a gas with a substantially lower thermal conductivity than the gas in said environmental chamber, through said hole in said top or bottom supporting frames.

30. The system of claim 19, wherein said thermometer is a resonator or multiple resonators.

31. The system of claim 19, wherein said membrane additionally comprises a strain relief element.

* * * * *